Aug. 16, 1960     T. M. OWENS     2,949,187
REMOVING IMPURITIES FROM FLUID SUSPENSIONS
Filed March 28, 1957     4 Sheets-Sheet 1

INVENTOR.
THOMAS M. OWENS
BY *Robert V. Morse*
ATTORNEY

Aug. 16, 1960 T. M. OWENS 2,949,187
REMOVING IMPURITIES FROM FLUID SUSPENSIONS
Filed March 28, 1957 4 Sheets-Sheet 3

INVENTOR.
THOMAS M. OWENS
BY
ATTORNEY

United States Patent Office 2,949,187
Patented Aug. 16, 1960

2,949,187
REMOVING IMPURITIES FROM FLUID SUSPENSIONS

Thomas M. Owens, Newton Falls, N.Y.

Filed Mar. 28, 1957, Ser. No. 649,198

7 Claims. (Cl. 209—2)

This invention relates to the removal of solid impurities from fluid suspensions. The invention is particularly useful for the removal of certain types of impurities from paper pulp which previous methods and apparatus have been unable to remove satisfactorily. Consequently the invention will be particularly described herein as applied to such use, though it may also be applied to other analogous operations.

Paper pulp, particularly such pulp made in whole or in part from waste paper, contains considerable amounts of all sorts of other materials such as rubber, tar, dirt, plastic, metal usually in the form of wire, and some fibrous materials not suitable for paper manufacture. In general the paper mill proceeds to remove the impurities by various machines in a series of steps, so that the pulp finally delivered to the paper making machines may carry to a very high degree only paper making fibers of a suitable character. The incoming bales of waste paper are fed to a hydrapulper system which reconverts such paper material back into paper pulp and removes the ink. It is then generally pumped to washing and refining machines, flowing through a series of rifflers which remove by weight the larger impurities and stock not de-fibered. The pulp then may flow over a series of screens where it is further refined by size; and then to centrifugal devices which take out impurities by centrifugal force. Such preliminary steps are those commonly used in many paper mills to reclaim the fibers of the incoming paper material for further use.

The successive screenings, ultimately down to a fine screen having holes in the order of ten to twelve thousandths of an inch, are designed to remove all foreign particles of a size that might cause defects in the paper; yet the pressure required to force fluid pulp through such fine mesh screens may also be sufficient to force through with it various viscous, elastic or compressible particles, such as rubber, tar, slime globules, etc., so that a considerable quantity of undesirable material may get through in the form of specks or threads. Also unsuitable fibers— mostly from cigarette papers—may form what are known as knots that do not permanently unite with the better fibers and later produce defects in the paper.

These difficulties are basically due to the fact that considerable hydraulic pressure is required to force the fluid pulp through such fine mesh screens, and so in the past such defects have had to be tolerated. The centrifugal cleaners, in which the fluid is whirled to separate out the heavier particles by centrifugal force, have been a useful refinement, but are not effective on particles that have substantially the same specific gravity as the fluid.

I have discovered that many of these impurities have distinct properties which enable them to be effectually removed from the fiber suspension in the following manner. An inflow of the suspension is provided to the nip between a moving screen and pressure member, the screen having openings of such fineness as will not pass the fibers or impurities. As the suspension passes through the nip it is squeezed against the surface of the screen by the pressure member. Due apparently to differences in their physical characteristics from the fibers, such as greater density, greater thickness, different size, greater plasticity or stickiness, the impurities are caused by this squeezing action to embed in the openings of the screen and/or to adhere to the screen surface while the fibers remain essentially as a thin layer on the outer surface of the screen and relatively non-adherent thereto. As the nip is passed, fluid that has flowed or been squeezed into the screen flows out and carries along with it the fibers but the impurities remain adhered to the screen. These impurities may then be separated from the screen by forced fluid jets.

Referring now to the drawings forming part of this specification.

Similar reference numerals refer to similar parts throughout the various views.

Figure 1:
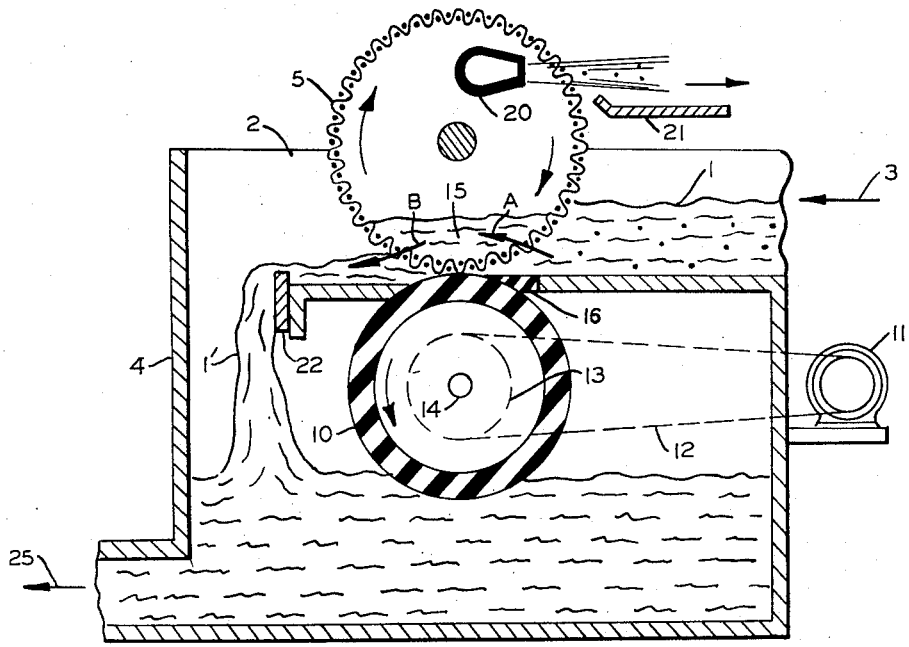
Fig. 1 is a cross-sectional view of one form of the apparatus showing the principal operating elements.

Referring now to Fig. 1, the pulp or stuff 1—which has been given the usual preliminary cleaning and screening treatment such as previously described—is by the present invention then caused to flow into an additional refining machine indicated in general by the reference numeral 2. The flowing pulp 1 enters as shown by the arrow 3 and flows into the upper part of a tank 4 in which its flow is impeded by the fine meshes of a rotating cylindrical screen 5 that extends substantially the length of the tank, with suitable end packings so that the fluid is compelled to flow through the screen. The mesh of the moving screen 5 is of a fineness such as will not pass the fibers and impurities at least in the absence of high hydraulic pressure. Such pressure is not present in the apparatus shown in Fig. 1 which only has a moderate hydraulic head flowing in at 3.

The incoming pulp flow is mostly water, carrying in suspension innumerable fine fibers from which the paper is to be made, together with particles of foreign matter to be here eliminated. As indicated by the arrow A, the water itself can flow through the fine openings in the screen 5 under the slight head established between the incoming suspension and the water 15 inside the rotating screen 5. But such a slight head of hydraulic pressure is incapable of forcing through the screen 5 either the paper fibers or the objectionable particles that went through the previous screen.

The paper fibers form a thin, loose layer or mat on the outer surface of the screen as the water goes through, and in that tenuous mat are also included the foreign particles of various materials and shapes, including not only relatively dense materials but also knots or slime globules, sometimes composed of fibers that have been so broken down as to have no further utility for paper making. This mat of non-fluid fibrous material forms itself almost instantaneously when the incoming pulp suspension impinges on the screen 5; but momentarily it serves the purpose of retaining both the good fibers and also the impurities on the outside of the screen as it rotates.

The moving screen 5 rests on a slightly resilient cylindrical roll 10 of rubber or other suitable material. The roll 10 is mounted so as to exert a pressure against the screen 5, and both extend the length of the tank 4, with suitable end packings or walls, so that there is no way for the water to pass through the apparatus without going through the screen 5. The roll 10 is driven by any suitable means such as a motor 11 and belt 12 running to a pulley 13 on the roll shaft 14 outside the tank. A rubber seal 16 prevents the incoming suspension from dropping directly into the bottom of the tank. The level of the effluent can be changed by means of adjustable dam 22.

As the water is finally squeezed through the fine mesh of the screen 5 by the action of the resilient roll 10, the paper fibers are compressed and flattened on the outer surface of the screen drum 5, while the impurities are pushed somewhat into and embedded in the meshes of that screen or relatively strongly adhered thereto.

The nip of the screen 5 and roll 10 as they come together applies pressure to the fibers and impurities suspended in a fluid state, squeezing the material to force the fluid through the screen 5 while at the same time compressing the fibers and forcing the impurities to embed in or adhere to the screen. This simultaneous action is characteristic of the present invention and differs in that respect from ordinary paper making processes where a sheet of wet fibers is first formed by straining out the water, and then later by gradual stages is compressed and dried to make paper.

The water 15 that has been forced inside the screen drum 5 seeks to escape outwardly through the screen after it has passed the roll 10 as indicated by the arrow B. This gentle head of outflowing water does not have sufficient force to dislodge the impurities but will carry off the desirable paper fibers which remain relatively loosely on the outside of the screen or on the pressure roll.

Figure 2:
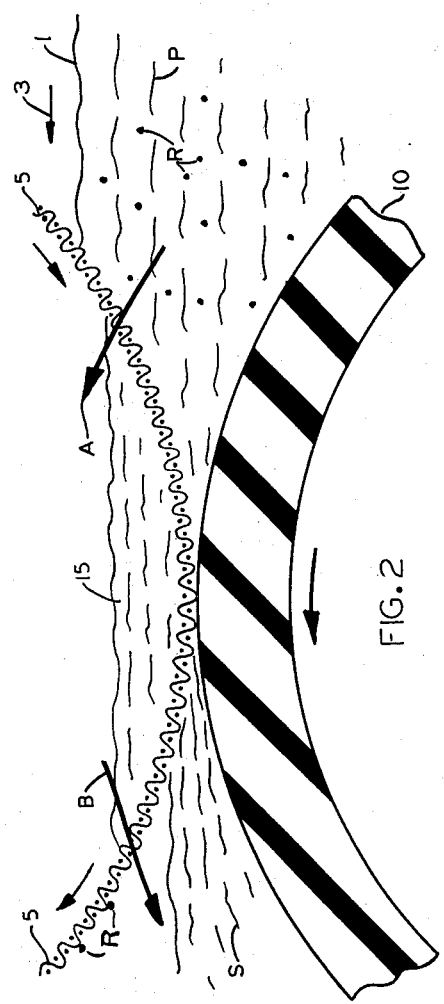
Fig. 2 is a schematic diagram, not drawn to scale, illustrating the principle of operation upon which the refinement is based.

In order to follow the phenomenon more clearly, reference is now made to Fig. 2, which is diagrammatic rather than pictorial. In it the paper fibers, the particles of impurities, and the degree of curvature of the screen and rubber roll are all greatly exaggerated for clarity of drawing; but it serves to visualize the operation.

For purposes of illustration in Fig. 2, the incoming pulp fibers P and impurities R (size exaggerated as mentioned), are shown flowing with the incoming water 1 in the direction of the arrow 3. The screen 5 and the resilient roll 10 are moving together to the left in the direction indicated by their arrows, and as a consequence the plup fibers P with the impurities R are squeezed between the screen 5 and the rubber roll 10. While the water with some of the more miscroscopic or soluble materials can flow through the fine screen 5 to the internal water pool 15 as indicated by the arrow A, the pulp fibers P of sufficient length to be desirable for paper making are unable to do so, and tend to accumulate on the outer surface of the rotating screen 5. The incoming pulp water is full of such good fibers in suspension, and when they encounter the screen 5 they immediately begin to coat it in a thin layer for which the speed of the machine is adjusted. In that layer are also caught the remaining specks and impurities that the previous steps have failed to eliminate.

This mat or layer of fiber and impurities is squeezed at the nip by the action of the roll 10, forcing the remaining water through the screen 5 to the inner pool 15, while forming the compacted fibers on the outside into more or less coherent areas S of various sizes together with various loose fibers, substantially all of which are readily washed away from the screen and pressure roll by the outward passage of water. The foreign matter however remains adhered to or embedded in the fine mesh of the screen 5. Accordingly, by utilizing a water flow that is too gentle to dislodge the adherent impure particles, an automatic selection of high quality paper fibers is obtained. The compacted paper fibers leaving the roll readily break down and revert to pulp when they are swept away by the water leaving the screen. The impurities remain attached to the screen until dislodged by high pressure cleaning jets 20 as shown in Fig. 1, to be carried off by the channel 21. The efficacy of this process in obtaining good paper fibers while separating out undesirable particles has been successfully demonstrated by actual experimental operation in a paper mill.

Returning now to the more general view of Fig. 1, the refined and purified pulp 1' flowing with the stream B drops from the dam 22 to fall into the reservoir of the tank 4 from which it passes on out as indicated by the arrow 25 to the further steps normally associated with paper making machinery.

Figure 3:
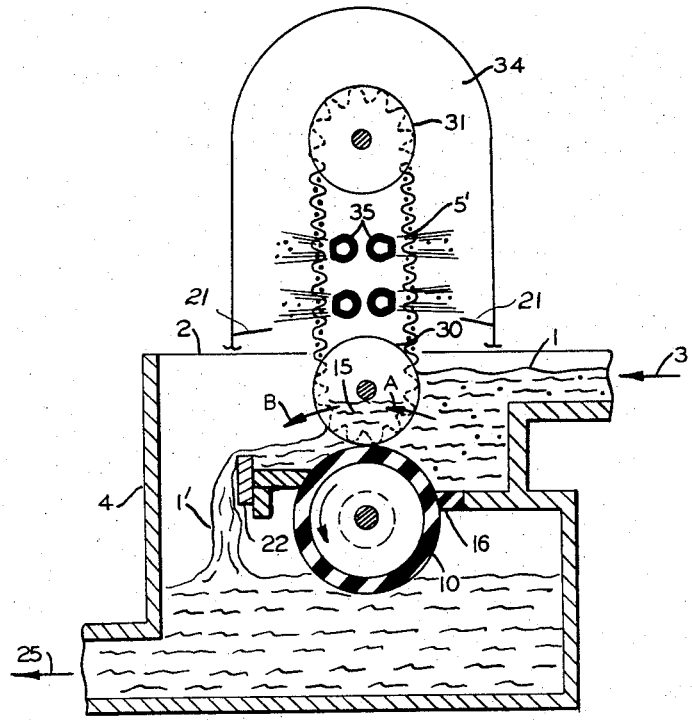
Fig. 3 shows how a screen belt may be used in place of the cylindrical drum screen of Fig. 1, to allow more time for cleaning out the rejected particles.

In cases where it is desirable to give the screen a longer cleaning—as for example when excessive amounts of tars or other especially resistant materials are present—the moving screen may be made in the form of a running belt instead of a cylindrical drum, so that its length outside the tank 4 and time available for cleaning is proportionately increased. One such modification is illustrated in Fig. 3, in which the screen belt 5' runs over a pair of pulleys 30 and 31. The lower pulley 30 is an open framework so that the fluid passing inward through the screen belt 5' can flow out again through the same screen belt 5' after passing the resilient roller 10, so as to function in the same manner as the screen and roller illustrated in Fig. 2.

Figure 4:
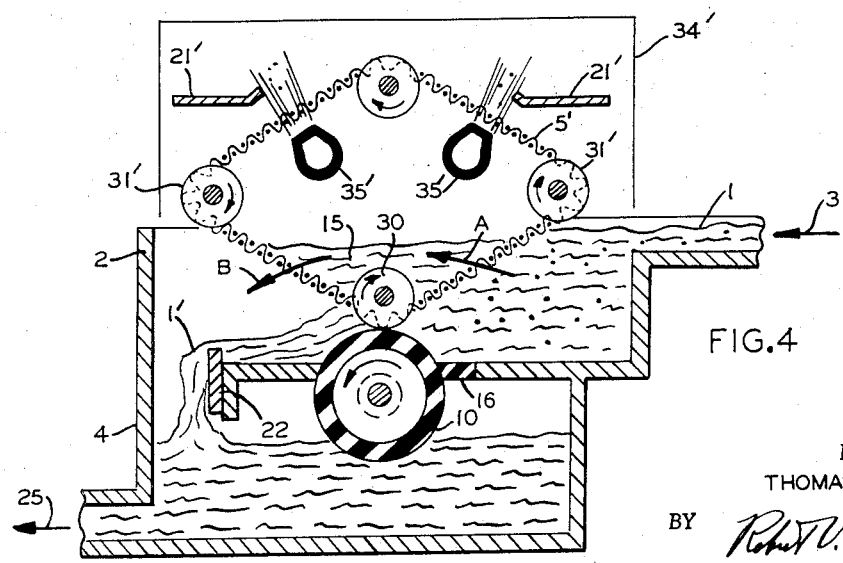
Fig. 4 is a diagrammatic view of a more elaborate modification showing a longer screen belt running over a multiplicity of wheels to provide for even more extended cleaning of the screen.

The screen belt 5' after leaving the tank 4 may be enclosed in a supplemental housing 34 containing various jets 35 of water, steam or cleaning chemicals by which the pellets of foreign matter are removed from the meshes of the screen belt 5'. If more extended cleaning treatment is found necessary, the screen belt 5' can be extended over any number of pulleys 31' as shown in Fig. 4, with jets or other scrubbing apparatus 35' and 21' arranged to do the cleaning of the meshes of the belt 5'. This may be enclosed if desired in a housing 34'. While such extended forms may be used, the hollow cylindrical screen drum first described in Fig. 1 has been found generally sufficient in practice.

Figure 5:
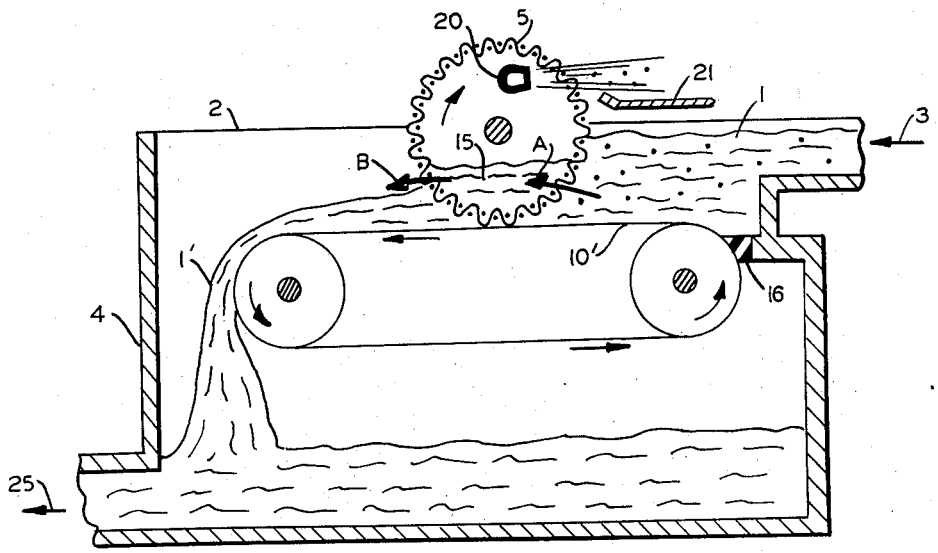
Fig. 5 shows a cylindrical screen but with a resilient belt instead of a resilient roll.
Figure 6:
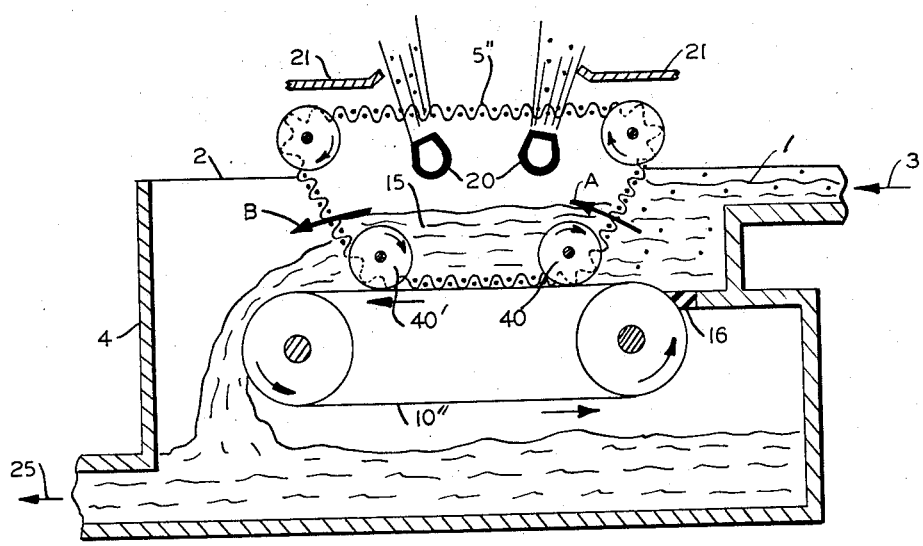
Fig. 6 shows a travelling screen over several pulleys in combination with an impervious resilient pressure belt travelling with it.

The foregoing modifications have embodied a moving screen with an impervious resilient roll to force the fibers and particles on to it. However, a similar effect can be accomplished by using a resilient belt 10' as shown in Fig. 5 and Fig. 6, in place of the resilient roll 10 shown in Fig. 1 to Fig. 4 inclusive. In Fig. 5 the cylindrical drum screen 5 operates in conjunction with an impervious resilient belt 10', in place of the roll 10. This gives a somewhat longer contact at the region where the film of pulp is being compacted and pressed against the screen drum 5, with the flow inward at A and outward at B.

In Fig. 6 a resilient impervious pressure belt 10" is also used, but in combination with a travelling screen 5" in place of the cylindrical screen drum 5. In this case the water flow is inward above the idler pulley 40 and outward above the idler pulley 40'. This gives a greater area to carry the flow which is inward at A and outward at B. The outwash at B carries with it the purified paper pulp, while the impurities are removed from the belt by the jets 20. The rest of the apparatus is similar to that previously described.

While it is preferred to use the apparatus of this invention at a stage following the other means for removing impurities, it may if desired be used at earlier stages with suitable adaptations to the material on which it is operating.

The general steps of forming a layer of the pulp fibers together with impurities on a fine screen as by an inwash, compressing the non-fluid materials of the layer on the screen but not through it, removing the good fibers while the impurities remain embedded in or adhered to the screen as by means of an outwash, and subsequently cleaning the screen of the impurities, is the basic principle used in all the modifications to attain the desired separation.

While I have in the foregoing described the invention as applied to paper mills by way of example, it will be understood that it is merely for the purpose of illustration to make clear the principles of the invention, which is not limited to the particular fluids and materials shown but is susceptible to various modifications and adaptations in different installations as will be apparent to those skilled in the art, without departing from the scope of the invention as stated in the following claims.

I claim:

1. Means for removing impurities from pulp comprising the combination of a channel providing an inflow of fluid containing fibers and impurities suspended therein, a moving screen of a fineness adapted to intercept the good fibers and the suspended impurities on the incoming side of said screen as it moves while the remaining fluid flows through the screen to the other side, a compression member placed along the path of the moving screen so as to form a nip, said nip serving to squeeze said fibers on the outside of said screen and to embed impurities in it, means providing an outward flow of fluid through the screen to assist in carrying off the fibers of said inflowing pulp fluid which thereupon revert to a suspension in the outgoing fluid as before while leaving the impurities embedded in the screen, and means for removing said embedded impurities at a subsequent part of the travel of the screen, so that the cleaned screen can return to repeat the foregoing cycle of operation.

2. Means for removing impurities from pulp comprising the combination of a channel providing a flow of fluid carrying in suspension good fibers together with small impurities suspended therein, a moving screen impeding said flow, said screen having a fineness sufficient to catch and hold both the good paper fibers and the impurities on the outer side of said screen while the remaining fluid flows through the screen to the inside, a compression element bearing on the outer side of the screen so as to compact the said fibers and impurities against it without forcing them through, means providing an outwash of fluid from inside the screen to assist in detaching and bearing away in the fluid pulp as before the good paper fibers from the outer side of the screen while the impurities remain temporarily adhered to said moving screen, and cleaning apparatus located at a subsequent part of the screen travel to remove the adhered impurities so that the cleaned screen may return to again intercept the incoming flow and repeat the foregoing cycle.

3. Means for removing impurities from a flow of fluid pulp comprising the combination of a moving screen, a channel for directing said flow against the moving screen with a sufficiently gentle pressure so that the pulp fibers and impurities suspended therein are caught against the screen and do not flow through it while the more fluid parts of the flow do pass through the screen to the other side, a compacting element following later in the path of the moving screen to compress said caught fibers and impurities on the surface of the screen, and thereafter in the travel of the screen a gentle head of fluid sufficient to carry off the fibers in fluid pulp as before for future use while leaving the resistant impurities adhered to the screen, and a vigorous cleaner applied to the screen subsequently in its travel so that the screen may be cleaned of the adherent impurities and returned to repeat the foregoing cycle of operation.

4. Means for removing impurities from pulp comprising the combination of a channel carrying an inflow of pulp and particles of impurities in fluid suspension, a rotary cylindrical screen in said channel having a fineness sufficient to intercept and hold good paper fibers and the particles of impurities thereon, the remaining fluid passing through to the interior of the cylindrical screen, a roll for compacting the fibers and impurities between itself and the screen at a nip to form a relatively loose fragile mat of the fibers while relatively firmly adhering the impurities to the screen, an outflow channel beyond said nip, there being a hydraulic head between the inside of the cylindrical screen and the outflow channel to assist in dislodging the fragile coating of fibers from the outer surface of the screen so that the fibers revert to a fluid pulp suspension while leaving the particles of impurities adhered to the screen, and a vigorous cleaning means located in subsequent portions of the screen travel to dislodge and remove the particles of impurities to prepare the screen to repeat the foregoing cycle.

5. Apparatus for removing impurities from pulp comprising in combination a channel for conveying an inflow of fluid pulp containing good fibers with impurities suspended therein, a moving screen dipping into the flow path so as to pick up a coating of good fibers together with impurities on the inflow side of said screen, means to compress said coating against said screen to adhere said impurities relatively firmly to the screen, hydraulic means providing an outwash from the other side of the screen beyond said compressing means to assist in dislodging and carrying away in fluid suspension the good fibers from said coating, and a vigorous cleaning apparatus for removing the impurities, said cleaning apparatus being located along the screen travel subsequent to the dislodging of the fibers, whereby the screen may be returned clean for another cycle of the foregoing operation.

6. Apparatus for removing solid impurities from fluid suspensions of fibers comprising in combination means providing an inflow of said suspension, a screen having a surface movable into and out of contact with said suspension and provided with openings therein of a size generally too small to pass said impurities and said fibers, a pressure member arranged to squeeze the solids of said suspension against said screen surface with such force as to cause said impurities to embed in and adhere relatively firmly to said screen surface, means for removing the fibers of said suspension from said screen and pressure member beyond the nip of said pressure member and screen surface so that the purified fibers may revert to fluid suspension while leaving said impurities adhering to said screen, and means for cleaning said screen of said impurities while out of contact with said suspension.

7. Apparatus for removing solid impurities from fluid suspensions containing also other more desirable solids comprising in combination means providing an inflow of said suspension, a screen having a surface movable into and out of contact with said suspension and provided with openings therein of a size generally smaller than said impurities, a pressure member arranged to squeeze the solids of said suspension against said screen surface with such force as to cause said impurities to adhere relatively firmly to said screen surface, means for removing the other solids and the fluid of said suspension from said screen and pressure member beyond the nip of said pressure member and screen surface so that the more desirable solids revert to fluid suspension while leaving said impurities adhering to said screen, and means for cleaning said screen of said impurities while out of contact with said suspension.

References Cited in the file of this patent

UNITED STATES PATENTS

| | | |
|---|---|---|
| 1,595,894 | Klund | Aug. 10, 1926 |
| 1,635,258 | Clarke | July 12, 1927 |
| 1,882,178 | Cumberland | Oct. 11, 1932 |
| 2,534,760 | Ellila | Dec. 19, 1950 |
| 2,685,235 | Lindblad | Aug. 3, 1954 |
| 2,751,086 | Borjeson | June 19, 1956 |